United States Patent
Nojima et al.

(10) Patent No.: US 6,576,217 B1
(45) Date of Patent: Jun. 10, 2003

(54) METHANOL REFORMING CATALYST, METHOD OF MANUFACTURING METHANOL REFORMING CATALYST AND METHOD OF REFORMING METHANOL

(75) Inventors: Shigeru Nojima, Hiroshima (JP); Toshinobu Yasutake, Hiroshima (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 0 days.

(21) Appl. No.: 09/619,139

(22) Filed: Jul. 18, 2000

(30) Foreign Application Priority Data

Aug. 11, 1999 (JP) ............................................. 11-227588

(51) Int. Cl.[7] .................................................. C01B 3/26
(52) U.S. Cl. ..................... 423/651; 423/650; 423/648.1; 502/342; 502/343; 502/346; 252/373
(58) Field of Search .............................. 423/648.1, 650, 423/651; 502/342, 343, 346; 252/373

(56) References Cited

U.S. PATENT DOCUMENTS

| | | | |
|---|---|---|---|
| 2,315,495 A | | 4/1943 | Beeg et al. |
| 4,552,861 A | * | 11/1985 | Courty et al. ................ 502/302 |
| 4,590,176 A | * | 5/1986 | Hoek et al. .................. 502/307 |
| 4,596,782 A | * | 6/1986 | Courty et al. ................ 502/302 |
| 5,112,591 A | | 5/1992 | Chaumette et al. ..... 423/415 A |
| 5,248,566 A | * | 9/1993 | Kumar et al. .................. 429/19 |
| 5,302,569 A | * | 4/1994 | Horn et al. .................. 502/342 |
| 6,153,161 A | * | 11/2000 | Fetzer et al. ............. 423/239.1 |

FOREIGN PATENT DOCUMENTS

| | | | |
|---|---|---|---|
| CA | 1 206 949 | 7/1986 | |
| CA | 1 233 810 | 3/1988 | |
| CA | 2026275 | 4/1991 | |
| CA | 1298826 | 4/1992 | |
| CA | 2163413 | 7/1996 | |
| CA | 2176311 | 11/1996 | |
| DE | 44 23 587 | 1/1996 | |
| JP | 58-193738 | * 11/1983 | ............ B01J/23/80 |
| JP | 61-007328 | 3/1986 | |
| JP | 61127601 A | * 6/1986 | ............. C01B/3/32 |
| JP | 3-52643 | 3/1991 | |
| JP | 2664997 | 6/1997 | |
| JP | 10-216522 | 8/1998 | |

OTHER PUBLICATIONS

Derwent Abstract, AN 1986–316077, JP 61–234942, Oct. 20, 1986.
N. Edwards, et al., Journal of Power Sources, vol. 71, No. 1–2, pps. 123–128, "On–Board Hydrogen Generation For Transport Applications: The Hotspot Methanol Processor", Mar. 15, 1998.
S. Velu, et al., Chem. Commun., pps. 2341–2342, "Oxidative Steam Reforming of Methanol Over CuZnAl (Zr)–Oxide Catalysts; A New and Efficient Method for the Production of Co–Free Hydrogen for Fuel Cells", 1999.

* cited by examiner

Primary Examiner—Stanley S. Silverman
Assistant Examiner—Peter J Lish
(74) Attorney, Agent, or Firm—Oblon, Spivak, McClelland, Maier & Neustadt, P.C.

(57) ABSTRACT

An object of the present invention is to provide a methanol reforming catalyst, which promotes both the steam reforming reaction and the partial oxidation reaction simultaneously so as to achieve a high methanol conversion rate and suppress the carbon monoxide formation. The present invention provides a methanol reforming catalyst having an oxide containing a Cu, Zn and Al.

21 Claims, No Drawings

METHANOL REFORMING CATALYST, METHOD OF MANUFACTURING METHANOL REFORMING CATALYST AND METHOD OF REFORMING METHANOL

CROSS-REFERENCE TO RELATED APPLICATIONS

This application is based upon and claims the benefit of priority from the prior Japanese Patent Application No. 11-227588, filed Aug. 11, 1999, the entire contents of which are incorporated herein by reference.

BACKGROUND OF THE INVENTION

The present invention relates to a methanol reforming catalyst, a method of manufacturing a methanol reforming catalyst and a method of reforming methanol.

In recent years, the earth environmental problem attracts attentions. In this connection, a fuel cell attracts attentions as a means for efficiently producing an electric energy without giving rise to an air pollution problem and a water contamination problem. Particularly, since harmful gases such as nitrogen oxides and carbon monoxide are contained in a large amount in the waste gas discharged from the internal combustion engines of a motor car or the like, various measures have been taken to overcome the problem of the harmful gases. As one of the measures against the problem, vigorous researches are being made in an attempt to develop a motor car utilizing a polymer electrolyte fuel cell (PEFC) in place of the internal combustion engine.

In the polymer electrolyte fuel cell (PEFC), hydrogen ($H_2$) is diffused within a polymer film as protons, and an electric energy is obtained from the electron migration accompanying the diffusion of the protons. In order to mount the polymer electrolyte fuel cell to a motor car, it is necessary to develop an efficient hydrogen manufacturing apparatus. Methanol is a cheap liquid fuel that can be easily synthesized from a fossil fuel. Also, methanol can be converted relatively easily into hydrogen by a catalytic reaction. A steam reforming reaction represented by formula (1) given below is known to the art as a method of manufacturing hydrogen from methanol:

$$CH_3OH + H_2O \rightarrow 3H_2 + CO_2 - 11.8 \text{ kcal/mol} \quad (1)$$

However, reaction (1) given above is an endothermic reaction, making it necessary to supply a large amount of heat from outside in order to maintain a predetermined temperature at which the catalyst performs its function. As a result, a large space is required in the case where a methanol reformer is mounted as a movable power source to, for example, a motor car, making it impractical to employ the steam reforming reaction (1) described above. Such being the situation, proposed are methods of manufacturing hydrogen by utilizing an exothermic reaction (2) or (3) given below, which involves an oxygen addition:

$$CH_3OH + 1/2 O_2 \rightarrow CO + H_2 + H_2O + 36.2 \text{ kcal/mol} \quad (2)$$

$$CH_3OH + 1/2 O_2 \rightarrow CO_2 + 2H_2 + 46.0 \text{ kcal/mol} \quad (3)$$

Among these exothermic reactions (2) and (3), reaction (3) is desirable. Specifically, exothermic reaction (3) permits manufacturing a larger amount of hydrogen gas ($H_2$) used as a fuel of PEFC. In addition, CO that is a poisoning material to PEFC is not generated in the exothermic reaction (3).

It is conceivable to provide a hydrogen manufacturing apparatus, in which the heat amount balance is controlled, and which is compact and excellent in its start up performance, by allowing reactions (1) and (3) given above to proceed simultaneously. However, a catalyst of a high reactivity, which permits reactions (1) and (3) to proceed simultaneously, has not yet been developed. It is of high importance in this technical field to develop such a catalyst.

BRIEF SUMMARY OF THE INVENTION

An object of the present invention is to provide a methanol reforming catalyst, which promotes both the steam reforming reaction given by formula (1) and the partial oxidation reaction given by formula (3) simultaneously so as to achieve a high methanol conversion rate and suppress the carbon monoxide formation, and a method of manufacturing the particular methanol reforming catalyst.

Another object of the present invention is to provide a methanol reforming method, which promotes both the steam reforming reaction given by formula (1) and the partial oxidation reaction given by formula (3) simultaneously so as to achieve a high methanol conversion rate and suppress the carbon monoxide formation.

According to a first aspect of the present invention, there is provided a methanol reforming catalyst comprising an oxide containing Cu, Zn and Al.

According to a second aspect of the present invention, there is provided a method of manufacturing a methanol reforming catalyst, comprising the steps of allowing an aqueous solution containing a copper component, an aqueous solution containing a zinc component and an aqueous solution containing an aluminum component to react with a precipitant consisting of an alkaline aqueous solution to bring about precipitation under an alkaline conditions so as to obtain a basic metal carbonate containing Cu, Zn and Al as a precipitate, washing the precipitate of the basic metal carbonate, and sintering the precipitate.

In the method of the present invention for manufacturing the methanol reforming catalyst, it is possible to add the three kinds of the aqueous solutions simultaneously or separately for the reaction with the precipitant.

According to a third aspect of the present invention, there is provided a method of manufacturing a methanol reforming catalyst, comprising the steps of allowing an aqueous solution containing a copper component, an aqueous solution containing a zinc component, an aqueous solution containing an aluminum component, and an aqueous solution containing metal component consisting of at least one element selected from the group consisting of La, Ca, Ga, Zr, Ce, Cr, Ba and Mg to react with a precipitant consisting of an alkaline aqueous solution to bring about precipitation under an alkaline conditions so as to obtain a basic metal carbonate containing Cu, Zn, Al and at least one element selected from the group consisting of La, Ca, Ga, Zr, Ce, Cr, Ba and Mg as a precipitate, washing the precipitate of the basic metal carbonate, and sintering the precipitate.

In the method of the present invention for manufacturing the methanol reforming catalyst, it is possible to add the four kinds of the aqueous solutions simultaneously or separately for the reaction with the precipitant.

According to a fourth aspect of the present invention, there is provided a methanol reforming method, comprising the step of bringing a gas containing methanol, steam and oxygen into contact with a methanol reforming catalyst having an oxide containing Cu, Zn and Al so as to allow methanol to react with the steam and oxygen, thereby forming a hydrogen-containing gas.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

A methanol reforming catalyst of the present invention will now be described.

The methanol reforming catalyst of the present invention contains a complex oxide having Cu, Zn and Al as metal components. In the present invention, an evaporated methanol is allowed to react with steam and oxygen in the presence of the methanol reforming catalyst so as to form a hydrogen-containing gas.

"The complex oxide" is not a mixture of plural metal oxides, but is a compound containing Cu, Zn and Al.

It is desirable for the oxide to further contain at least one element selected from the group consisting of La, Ca, Ga, Zr, Ce, Cr, Ba and Mg in addition to Cu, Zn and Al noted above.

The complex oxide should desirably have a composition represented by general formula (1) given below:

$$(CuO)_w(ZnO)_x(Al_2O_3)_yM_z \quad (1)$$

where M is at least one kind of an oxide selected from the group consisting of lanthanum oxide, calcium oxide, gallium oxide, zirconium oxide, cerium oxide, chromium oxide, barium oxide and magnesium oxide, and the molar ratios w, x, y and z should be: $w=100$, $30 \leq x \leq 160$, $1 \leq y \leq 50$ and $0 \leq z \leq 30$.

It is important for the molar ratios w, x, y and z to fall within the ranges noted above, as described below.

(Molar Ratio w of Copper Component)

Cu serves to adsorb methanol thereon. By setting the molar ratio w at 100 in formula (1) given above, the adsorption point of methanol can be ensured sufficiently.

(Molar Ratio x of Zinc Component)

Zn serves to adsorb oxygen and steam. If the molar ratio x is set smaller than 30, the adsorption points of steam and oxygen tend to be decreased, leading to a low activity of the methanol reforming catalyst. If the molar ratio x is set larger than 160, however, the adsorption points of methanol tend to be decreased, leading to a low activity of the methanol reforming catalyst. More preferably, the molar ratio x should fall within a range of 40 and 150, i.e., $40 \leq x \leq 150$.

(Molar Ratio y of Aluminum Component)

Al serves to improve the dispersion of Cu and Zn in the complex oxide and permits Zn to be positioned in the vicinity of the Cu. If the molar ratio y is lower than 1, it is difficult to disperse sufficiently Cu and Zn. On the other hand, if the molar ratio y is higher than 50, the contents of Cu and Zn tend to be lowered in the complex oxide, leading to a low activity of the methanol reforming catalyst. More preferably, the molar ratio y should fall within a range of between 2 and 40, i.e., $2 \leq y \leq 40$.

(Molar Ratio z of Metal Component)

The metal consisting of at least one element selected from the group consisting of la, Ca, Ga, Zr, Ce, Cr, Ba and Mg mainly serves to improve the dispersion of Cu and Zn and also serves to suppress the sintering by heat. If the molar ratio z is higher than 30, the contents of Cu, Zn and Al of the complex oxide tend to be lowered, leading to a low activity of the methanol reforming catalyst. More preferably, the molar ratio z should fall within a range of between 0.3 and 25, i.e., $0.3 \leq z \leq 25$.

It is desirable for the specific surface area as measured by a BET method of the complex oxide to fall within a range of between 30 m²/g and 250 m²/g. If the specific surface area is smaller than 30 m²/g, the adsorption sites of the methanol, steam and oxygen tend to be diminished, leading to a low activity of the methanol reforming catalyst. On the other hand, in order to increase the specific surface area to exceed 250 m²/g, it is necessary to increase the pore in the complex oxide. In this case, the complex oxide tends to fail to assume a desired crystal structure, leading to a low activity of the methanol reforming catalyst. More preferably, the specific surface area of the complex oxide should fall within a range of between 35 m²/g and 210 m²/g.

How to manufacture a methanol reforming catalyst of the present invention will now be described.

(First Step)

In the first step, a complex basic metal carbonate having Cu, Zn and Al as metal components is obtained as a precipitate by allowing an aqueous solution containing a copper component, an aqueous solution containing a zinc component and an aqueous solution containing an aluminum component to react with a precipitant consisting of an alkaline solution so as to bring about precipitation under an alkaline conditions. It is desirable for the reactions between the precipitant and the three kinds of the aqueous solutions to be neutralizing reactions. Also, these three kinds of the aqueous solutions can be added simultaneously or separately. The first step is carried out by method (a) or (b) described below:

(a) A precipitate of the complex basic metal carbonate is obtained by dripping aqueous solutions containing a copper ion, a zinc ion and an aluminum ion while stirring. the precipitant so as to form a precipitate under alkaline conditions. It is desirable to finish the dripping of the aqueous solutions when the pH value has reached 7.

(b) A precipitate of the complex basic metal carbonate is obtained by dripping aqueous solutions containing a zinc ion and an aluminum ion while stirring the precipitant so as to form a precipitate under alkaline conditions, followed by dripping an aqueous solution containing a copper ion so as to permit precipitation of the copper on the surface of the precipitate formed previously under alkaline conditions. It is desirable to finish the dripping of the aqueous solution containing a copper ion when the pH value has reached 7.

Where a complex oxide having Cu, Zn, Al and at least one element selected from the group consisting of La, Ca, Ga, Zr, Ce, Cr, Ba and Mg as metal components is obtained by method (b) described above, it is desirable to add the metal ion noted above to the aqueous solution containing the zinc ion and the aluminum ion.

In each of methods (a) and (b) described above, it is possible to use at least one kind of an aqueous solution selected from the group consisting of an aqueous solution of, for example, sodium carbonate ($Na_2CO_3$) and an aqueous solution of sodium bicarbonate ($NaHCO_3$) as the alkaline solution constituting the precipitant.

It is desirable for the temperature of the precipitant to be maintained at 15° C. to 90° C. By controlling the temperature of the precipitant to fall within the range noted above, it is possible to allow a basic metal carbonate having a desired crystal structure to precipitate.

The complex basic metal carbonate can be a double salt. It is desirable for the complex basic metal carbonate to have a crystal structure having at least one kind of a crystal type selected from the group consisting of $Cu_2CO_3(OH)_2$, (Cu, $Zn)_2CO_3(OH)_2$, $Zn_4CO_3(OH)_6 \cdot H_2O$ and $(Cu, Zn)_8Al_2O_3(OH)_{16} \cdot H_2O$. In the complex basic metal carbonate having the particular crystal structure, $CO_2$ is released in the subsequent sintering step described herein later. Since the position where $CO_2$ is released forms a void constituting a desirable fine pore, the complex oxide obtained after the sintering step is allowed to have a large specific surface area. It should be noted that it is possible for the crystal structure of the complex basic metal carbonate to include an amorphous structure.

(Second Step)

In the second step, the complex basic metal carbonate is washed and, then, sintered to obtain a methanol reforming catalyst consisting of a complex oxide having Cu, Zn and Al as metal components and effective for allowing the evaporated methanol to react with steam and oxygen to form a hydrogen-containing gas.

A methanol reforming method using the methanol reforming catalyst of the present invention will now be described.

The methanol reforming method of the present invention comprises the step of bringing a reaction gas containing an evaporated methanol, steam and oxygen into contact with the methanol reforming catalyst so as to permit the steam and oxygen to react with methanol to form a hydrogen-containing gas.

In the reaction gas, it is desirable for the molar ratio of steam to methanol ($H_2O/CH_3OH$), i.e., the number of mol of steam per mol of methanol, to fall within a range of between 0.4 and 10. If the molar ratio is lower than 0.4, carbon monoxide tends to be formed in a large amount. On the other hand, if the molar ratio is higher than 10, the steam tends to remain unreacted in a large amount, leading to a low reaction efficiency. More preferably, the molar ratio of the steam to methanol should fall within a range of between 0.6 and 7.

In the reaction gas, it is desirable for the molar ratio of oxygen to methanol ($O_2/CH_3OH$), i.e., the number of mol of oxygen per mol of methanol, to fall within a range of between 0.03 and 2. If the molar ratio of oxygen is lower than 0.03, the amount of the hydrogen gas formed by the reaction between methanol and oxygen tends to be diminished, resulting in failure to improve sufficiently the methanol conversion rate. On the other hand, if the molar ratio of oxygen is higher than 2, a complete oxidizing reaction tends to take place in place of the partial oxidizing reaction, leading to a small amount of the hydrogen formation. More preferably, the molar ratio of oxygen to methanol should fall within a range of between 0.04 and 1.6.

When the reaction gas is brought into contact with the methanol reforming catalyst, it is desirable for the temperature of the reaction gas to be controlled to fall within a range of between 100° C. and 400° C. If the temperature of the reaction gas is lower than 100° C., the activity of the catalyst tends to be lowered. If the temperature of the reaction gas exceeds 400° C., however, the durability of the catalyst tends to be lowered. More preferably, the temperature of the reaction gas should fall within a range of between 140° C. and 350° C.

When the reaction gas is brought into contact with the methanol reforming catalyst, it is desirable for the pressure of the reaction gas to be controlled to fall within a range of between atmospheric pressure and 80 atm. If the pressure of the reaction gas is lower than the atmospheric pressure, the yield of the hydrogen gas formed tends to be lowered. On the other hand, if the pressure of the reaction gas exceeds 80 atm, a high power is required for operating the compressor. Therefore, it is not practical for the pressure of the reaction gas to exceed 80 atm. More preferably, the pressure of the reaction gas should fall within a range of between atmospheric pressure and 50 atm.

The methanol reforming catalyst of the present invention described above in detail includes an oxide containing Cu, Zn and Al and serves to permit steam and oxygen to react with methanol so as to form a hydrogen-containing gas. According to the methanol reforming catalyst of the present invention, it is possible to promote both the steam reforming reaction represented by reaction formula (1) given previously, in which reaction is carried out between an evaporated methanol and steam, and the partial oxidizing reaction represented by reaction formula (3) given previously, in which a reaction is carried out between methanol and oxygen. It follows that it is possible to improve the methanol conversion rate while suppressing the carbon monoxide formation. Also, since the steam reforming reaction is an endothermic reaction and the partial oxidizing reaction is an exothermic reaction, it is possible to control easily the balance of the heat amount. It follows that it is possible to realize a hydrogen manufacturing apparatus that is compact and excellent in the start-up performance. Further, the catalyst of the present invention makes it possible to manufacture a hydrogen-containing gas containing carbon monoxide in an amount not larger than 4%. It follows that it is possible to manufacture a fuel gas for a polymer electrolyte fuel cell.

In the methanol reforming catalyst of the present invention, it is possible to further improve the activity and to suppress the thermal deterioration by allowing the oxide to contain at least one element selected from the group consisting of La, Ca, Ga, Zr, Ce, Cr, Ba and Mg.

In the methanol reforming catalyst of the present invention, it is possible to further improve the activity by allowing the oxide to have a composition represented by the formula $(CuO)_w(ZnO)_x(Al_2O_3)_yM_z$.

In the methanol reforming catalyst of the present invention, it is possible to further improve the activity because it is possible to ensure a sufficient adsorption site by allowing the oxide to have a specific surface area falling within a range of between 30 and 250 $m^2/g$.

The method of the present invention for manufacturing a methanol reforming catalyst comprises the steps of allowing an aqueous solution containing a copper component, an aqueous solution containing a zinc component and an aqueous solution containing an aluminum component to react with a precipitant consisting of an alkaline aqueous solution to bring about precipitation under an alkaline conditions so as to obtain a basic metal carbonate containing Cu, Zn and Al as a precipitate, washing the precipitate of the basic metal carbonate, and sintering the precipitate. The particular method of the present invention makes it possible to obtain a methanol reforming catalyst consisting of an oxide containing Cu, Zn and Al and allowing steam and oxygen to react with an evaporated methanol to form a hydrogen-containing gas.

In the method of the present invention for manufacturing a methanol reforming catalyst, it is desirable for the basic metal carbonate to have a crystal structure having at least one kind of a crystal type selected from the group consisting of $Cu_2CO_3(OH)_2$, $(Cu, Zn)_2CO_3(OH)_2$, $Zn_4CO_3(OH)_6 \cdot H_2O$ and $(Cu, Zn)_8Al_2O_3(OH)_{16} \cdot H_2O$. In this case, the specific surface area of the oxide is increased, leading to a further improved activity of the methanol reforming catalyst.

According to the methanol reforming method of the present invention, the gas containing a methanol, steam and an oxygen gas is brought into contact with the methanol reforming catalyst of the presen invention so as to promote both the steam reforming reaction represented by reaction formula (1) given previously and the partial oxidizing reaction represented by reaction formula (3) given previously, making it possible to increase the methanol conversion rate while suppressing the carbon monoxide formation. It is also possible to control easily the balance of the heat amount, making it possible to realize a hydrogen manufacturing apparatus that is compact and excellent in its start-up performance. Further, the methanol reforming method of the present invention permits forming a hydrogen-containing gas containing carbon monoxide in an amount not larger than 4%. In other words, the methanol reforming method of the present invention makes it possible to manufacture a fuel gas for a polymer electrolyte fuel cell.

In the methanol reforming method of the present invention, the methanol conversion rate can be further improved and the carbon monoxide formation can be further suppressed by setting the molar ratio of steam to methanol ($H_2O/CH_3OH$) in the gas to fall within a range of between 0.4 and 10 and by setting the molar ratio of oxygen to methanol ($O_2/CH_3OH$) in the gas to fall within a range of between 0.03 and 2.

In the methanol reforming method of the present invention, it is possible to suppress the thermal deterioration of the catalyst while improving the activity of the catalyst by setting the temperature of the gas at 100 to 400° C.

Further, in the methanol reforming method of the present invention, it is possible to further increase the hydrogen yield and to lower the reforming cost by controlling the pressure of the gas to fall within a range of between atmospheric pressure and 80 atm.

Some Examples of the present invention will now be described.

EXAMPLE 1

[Preparation of Catalyst 1]

Solution A (precipitant) was prepared by dissolving 2.5 mol of sodium carbonate ($Na_2CO_3$) in 2 liters of water and by maintaining the temperature of the resultant aqueous solution at 70° C. Also, solution B containing zinc ions was prepared by dissolving 0.225 mol of zinc nitrate $\{Zn(NO_3)_2 \cdot 6H_2O\}$ in 400 cc of water and by maintaining the resultant aqueous solution at 60° C. Further, solution C containing aluminum ions was prepared by dissolving 0.075 mol of aluminum nitrate $\{Al(NO_3)_3 \cdot 9H_2O\}$ in 400 cc of water and by maintaining the resultant aqueous solution at 60° C. Still further, solution D containing copper ions was prepared by dissolving 0.3 mol of copper nitrate $\{Cu(NO_3)_2 \cdot 3H_2O\}$ in 200 cc of water and by maintaining the resultant aqueous solution at 60° C.

In the first step, a mixed solution of solutions B and C was dripped at a constant dripping rate over 30 minutes while stirring solution A so as to bring about a precipitate and, thus, to obtain a suspension. Then, solution D was dripped into the suspension to bring about a precipitate on the surface of the precipitate formed previously so as to obtain a precipitate of a double basic metal carbonate containing Cu, Zn and Al. The pH value was found to be 7 at the completion of the dripping. Aging was performed for one hour after completion of the dripping, followed by filtering the precipitate and subsequently washing the precipitate such that Na ions and $NO_3$ ions are not detected. Further, the precipitate was dried at 100° C. for 24 hours so as to obtain a double basic metal carbonate containing Cu, Zn and Al. The crystal structure of the carbonate was measured, with the result that the carbonate was found to have crystal types of $\hat{1}$ $\{Cu_2CO_3(OH)_2\}$ and $\hat{3}$ $\{Zn_4CO_3(OH)_6 \cdot H_2O\}$, as shown in Table 1. Incidentally, Al is present in the amorphous structure.

In the next step, the complex basic metal carbonate thus prepared was sintered at 300° C. for 3 hours under the air atmosphere so as to obtain a complex oxide containing a copper ion, a zinc ion, and an aluminum ion, and having a composition and specific surface area (BET method) shown in Table 1. The complex oxide thus obtained is catalyst 1.

[Preparation of Catalyst 2]

Solution C containing lanthanum ions and aluminum ions was prepared by dissolving 0.075 mol of aluminum nitrate $\{Al(NO_3)_3 \cdot 9H_2O\}$ and 0.025 mol of lanthanum nitrate in 400 cc of water and by maintaining the resultant aqueous solution at 60° C.

A double basic metal carbonate containing Cu, Zn, Al and La was prepared as in preparation of catalyst 1, except that solution C noted above was used in place of solution C used in preparation of catalyst 1. The crystal structure of the carbonate was measured, with the result that the carbonate was found to have crystal types of $\hat{1}$ $\{Cu_2CO_3(OH)_2\}$ and $\hat{3}$ $\{Zn_4CO_3(OH)_6 \cdot H_2O\}$, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a lanthanum ion, and having a composition and specific surface area (BET method) shown in Table 1. The complex oxide thus obtained is catalyst 2.

[Preparation of Catalyst 3]

Solution C containing Al ions and Ca ions was prepared by dissolving 0.075 mol of aluminum nitrate $\{Al(NO_3)_3 \cdot 9H_2O\}$ and 0.025 mol of calcium nitrate in 400 cc of water and by maintaining the resultant aqueous solution at 60° C.

A double basic metal carbonate containing Cu, Zn, Al and Ca was prepared as in preparation of catalyst 1, except that solution C noted above was used in place of solution C used in preparation of catalyst 1. The crystal structure of the carbonate was measured, with the result that the carbonate was found to have crystal types of $\hat{1}$ $\{Cu_2CO_3(OH)_2\}$, $\hat{2}$ $\{(Cu, Zn)_2CO_3(OH)_2\}$, and $\hat{3}$ $\{Zn_4CO_3(OH)_6 \cdot H_2O\}$, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a calcium ion, and having a composition and specific surface area (BET method) shown in Table 1. The complex oxide thus obtained is catalyst 3.

[Preparation of Catalyst 4]

Solution C containing Al ions and Ga ions was prepared by dissolving 0.075 mol of aluminum nitrate $\{Al(NO_3)_3 \cdot 9H_2O\}$ and 0.025 mol of gallium nitrate in 400 cc of water and by maintaining the resultant aqueous solution at 60° C.

A double basic metal carbonate containing Cu, Zn, Al and Ga was prepared as in preparation of catalyst 1, except that solution C noted above was used in place of solution C used in preparation of catalyst 1. The crystal structure of the carbonate was measured, with the result that the carbonate was found to have crystal types of $\hat{1}$ $\{Cu_2CO_3(OH)_2\}$ and $\hat{3}$ $\{Zn_4CO_3(OH)_6 \cdot H_2O\}$, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a gallium ion, and having a composition and specific surface area (BET method) shown in Table 1. The complex oxide thus obtained is catalyst 4.

[Preparation of Catalyst 5]

Solution C containing Al ions and Zr ions was prepared by dissolving 0.075 mol of aluminum nitrate $\{Al(NO_3)_3 \cdot 9H_2O\}$ and 0.025 mol of zirconium oxynitrate in 400 cc of water and by maintaining the resultant aqueous solution at 60° C.

A double basic metal carbonate containing Cu, Zn, Al and Zr was prepared as in preparation of catalyst 1, except that solution C noted above was used in place of solution C used in preparation of catalyst 1. The crystal structure of the carbonate was measured, with the result that the carbonate was found to have crystal types of $\hat{1}$ $\{Cu_2CO_3(OH)_2\}$ and $\hat{3}$ $\{Zn_4CO_3(OH)_6.H_2O\}$, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a zirconium ion, and having a composition and specific surface area (BET method) shown in Table 1. The complex oxide thus obtained is catalyst 5.

[Preparation of Catalyst 6]

Solution C containing Al ions and Ce ions was prepared by dissolving 0.075 mol of aluminum nitrate $\{Al(NO_3)_3.9H_2O\}$ and 0.025 mol of cerium nitrate in 400 cc of water and by maintaining the resultant aqueous solution at 60° C.

A double basic metal carbonate containing Cu, Zn, Al and Ce was prepared as in preparation of catalyst 1, except that solution C noted above was used in place of solution C used in preparation of catalyst 1. The crystal structure of the carbonate was measured, with the result that the carbonate was found to have crystal types of $\hat{1}$ $\{Cu_2CO_3(OH)_2\}$, $\hat{2}$ $\{(Cu, Zn)_2CO_3(OH)_2\}$, and $\hat{3}$ $\{Zn_4CO_3(OH)_6.H_2O\}$, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a cerium ion, and having a composition and specific surface area (BET method) shown in Table 1. The complex oxide thus obtained is catalyst 6.

[Preparation of Catalyst 7]

Solution C containing Al ions and Cr ions was prepared by dissolving 0.075 mol of aluminum nitrate $\{Al(NO_3)_3.9H_2O\}$ and 0.025 mol of chromium nitrate in 400 cc of water and by maintaining the resultant aqueous solution at 60° C.

A double basic metal carbonate containing Cu, Zn, Al and Cr was prepared as in preparation of catalyst 1, except that solution C noted above was used in place of solution C used in preparation of catalyst 1. The crystal structure of the carbonate was measured, with the result that the carbonate was found to have crystal types of $\hat{1}$ $\{Cu_2CO_3(OH)_2\}$, $\hat{2}$ $\{(Cu, Zn)_2CO_3(OH)_2\}$, and $\hat{3}$ $\{Zn_4CO_3(OH)_6.H_2O\}$, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a chromium ion, and having a composition and specific surface area (BET method) shown in Table 1. The complex oxide thus obtained is catalyst 7.

[Preparation of Catalyst 8]

Solution C containing Al ions and Ba ions was prepared by dissolving 0.075 mol of aluminum nitrate $\{Al(NO_3)_3.9H_2O\}$ and 0.025 mol of barium nitrate in 400 cc of water and by maintaining the resultant aqueous solution at 60° C.

A double basic metal carbonate containing Cu, Zn, Al and Ba was prepared as in preparation of catalyst 1, except that solution C noted above was used in place of solution C used in preparation of catalyst 1. The crystal structure of the carbonate was measured, with the result that the carbonate was found to have crystal types of $\hat{1}$ $\{Cu_2CO_3(OH)_2\}$ and $\hat{3}$ $\{Zn_4CO_3(OH)_6.H_2O\}$, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a barium ion, and having a composition and specific surface area (BET method) shown in Table 1. The complex oxide thus obtained is catalyst 8.

[Preparation of Catalyst 9]

Solution C containing Al ions and Mg ions was prepared by dissolving 0.075 mol of aluminum nitrate $\{Al(NO_3)_3.9H_2O\}$ and 0.025 mol of magnesium nitrate in 400 cc of water and by maintaining the resultant aqueous solution at 60° C.

A double basic metal carbonate containing Cu, Zn, Al and Mg was prepared as in preparation of catalyst 1, except that solution C noted above was used in place of solution C used in preparation of catalyst 1. The crystal structure of the carbonate was measured, with the result that the carbonate was found to have crystal types of $\hat{1}$ $\{Cu_2CO_3(OH)_2\}$, $\hat{2}$ $\{(Cu, Zn)_2CO_3(OH)_2\}$, and $\hat{3}$ $\{Zn_4CO_3(OH)_6.H_2O\}$, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a magnesium ion, and having a composition and specific surface area (BET method) shown in Table 1. The complex oxide thus obtained is catalyst 9.

[Preparation of Catalyst 10]

Solution B containing Zn ions was prepared by dissolving 0.375 mol of zinc nitrate $\{Zn(NO_3)_2.6H_2O\}$ in 400 cc of water and by maintaining the resultant aqueous solution at 60° C.

A double basic metal carbonate containing Cu, Zn, Al and Mg was prepared as in preparation of catalyst 9, except that solution B noted above was used in place of solution B used in preparation of catalyst 9. The crystal structure of the carbonate was measured, with the result that the carbonate was found to have crystal types of $\hat{1}$ $\{Cu_2CO_3(OH)_2\}$, $\hat{3}$ $\{Zn_4CO_3(OH)_6.H_2O\}$ and $\hat{4}$ $\{(Cu, Zn)_8Al_2CO_3(OH)_{16}.H_2O\}$, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a magnesium ion, and having a composition and specific surface area (BET method) shown in Table 1. The complex oxide thus obtained is catalyst 10.

[Preparation of Catalyst 11]

Solution C containing Al ions and Mg ions was prepared by dissolving 0.1 mol of aluminum nitrate $\{Al(NO_3)_3.9H_2O\}$ and 0.025 mol of magnesium nitrate in 400 cc of water and by maintaining the resultant aqueous solution at 60° C.

A double basic metal carbonate containing Cu, Zn, Al and Mg was prepared as in preparation of catalyst 1, except that solution C noted above was used in place of solution C used in preparation of catalyst 1. The crystal structure of the carbonate was measured, with the result that the carbonate was found to have crystal types of $\hat{1}$ $\{Cu_2CO_3(OH)_2\}$, $\hat{3}$ $\{Zn_4CO_3(OH)_6.H_2O\}$ and $\hat{4}$ $\{(Cu, Zn)_8Al_2CO_3(OH)_{16}.H_2O\}$, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a magnesium ion, and having a composition and specific surface area (BET method) shown in Table 1. The complex oxide thus obtained is catalyst 11.

[Preparation of Catalyst 12]

Solution C containing Al ions and Mg ions was prepared by dissolving 0.075 mol of aluminum nitrate {Al(NO$_3$)$_3$.9H$_2$O} and 0.05 mol of magnesium nitrate in 400 cc of water and by maintaining the resultant aqueous solution at 60° C.

A double basic metal carbonate containing Cu, Zn, Al and Mg was prepared as in preparation of catalyst 1, except that solution C noted above was used in place of solution C used in preparation of catalyst 1. The crystal structure of the carbonate was measured, with the result that the carbonate was found to have crystal types of $\hat{1}$ {Cu$_2$CO$_3$(OH)$_2$}, and $\hat{3}$ {Zn$_4$CO$_3$(OH)$_6$.H$_2$O}, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a magnesium ion, and having a composition and specific surface area (BET method) shown in Table 1. The complex oxide thus obtained is catalyst 12.

[Preparation of Catalyst 13]

Solution A (precipitant) was prepared by dissolving 5 mol of sodium bicarbonate (NaHCO$_3$) in 2 liters of water and by maintaining the resultant aqueous solution at 70° C.

A double basic metal carbonate containing Cu, Zn, Al and Mg was prepared as in preparation of catalyst 9, except that solution A noted above was used in place of solution A used in preparation of catalyst 9. The crystal structure of the carbonate was measured, with the result that the carbonate was found to have crystal types of $\hat{1}$ {Cu$_2$CO$_3$(OH)$_2$}, and $\hat{3}$ {Zn$_4$CO$_3$(OH)$_6$.H$_2$O}, as shown in Table 1.

In the next step, the double basic metal carbonate thus prepared was sintered at 300° C. for 3 hours under the air atmosphere so as to obtain a complex oxide containing a copper ion, a zinc ion, an aluminum ion and a magnesium ion, and having a composition and specific surface area (BET method) shown in Table 1. The complex oxide thus obtained is catalyst 13.

[Comparative Catalyst]

Used were solutions A, C and D similar to those used for preparation of catalyst 1. In the first step, solutions C and D were mixed, followed by adding solution A to the resultant mixed solution to obtain a suspension. Then, the precipitate was filtered and the precipitate was washed with water such that Na ions and NO$_3$ ions were not detected. Further, a hydroxide containing Cu and Al was obtained by drying at 100° C. for 24 hours. The crystal structure of the hydroxide was measured, with the result that crystal type $\hat{5}$ {Cu(OH)NO$_3$} was recognized, as shown in Table 1.

In the next step, the hydroxide thus prepared was sintered at 300° C. for 3 hours under the air atmosphere so as to obtain a complex oxide containing a copper ion and an aluminum ion, and having a composition and specific surface area (BET method) shown in Table 1. The complex oxide thus obtained is a comparative catalyst.

TABLE 1

| Catalyst No. | Catalyst composition | Solution A (aqueous solution) | Crystal structure of basic metal carbonate | Specific surface area (m$^2$/g) |
|---|---|---|---|---|
| 1 | (CuO)$_{100}$(ZnO)$_{75}$(Al$_2$O$_3$)$_{12.5}$ | Na$_2$CO$_3$ | (1)(3) | 112 |
| 2 | (CuO)$_{100}$(ZnO)$_{75}$(Al$_2$O$_3$)$_{12.5}$(La$_2$O$_3$)$_{4.1}$ | Na$_2$CO$_3$ | (1)(3) | 123 |
| 3 | (CuO)$_{100}$(ZnO)$_{75}$(Al$_2$O$_3$)$_{12.5}$(CaO)$_{8.3}$ | Na$_2$CO$_3$ | (1)(2)(3) | 110 |
| 4 | (CuO)$_{100}$(ZnO)$_{75}$(Al$_2$O$_3$)$_{12.5}$(Ga$_2$O$_3$)$_{4.1}$ | Na$_2$CO$_3$ | (1)(3) | 134 |
| 5 | (CuO)$_{100}$(ZnO)$_{75}$(Al$_2$O$_3$)$_{12.5}$(ZrO$_2$)$_{8.3}$ | Na$_2$CO$_3$ | (1)(3) | 143 |
| 6 | (CuO)$_{100}$(ZnO)$_{75}$(Al$_2$O$_3$)$_{12.5}$(Ce$_2$O$_3$)$_{4.1}$ | Na$_2$CO$_3$ | (1)(2)(3) | 152 |
| 7 | (CuO)$_{100}$(ZnO)$_{75}$(Al$_2$O$_3$)$_{12.5}$(Cr$_2$O$_3$)$_{4.1}$ | Na$_2$CO$_3$ | (1)(2)(3) | 100 |
| 8 | (CuO)$_{100}$(ZnO)$_{75}$(Al$_2$O$_3$)$_{12.5}$(BaO)$_{8.3}$ | Na$_2$CO$_3$ | (1)(3) | 97 |
| 9 | (CuO)$_{100}$(ZnO)$_{75}$(Al$_2$O$_3$)$_{12.5}$(MgO)$_{8.3}$ | Na$_2$CO$_3$ | (1)(2)(3) | 79 |
| 10 | (CuO)$_{100}$(ZnO)$_{75}$(Al$_2$O$_3$)$_{12.5}$(MgO)$_{8.3}$ | Na$_2$CO$_3$ | (1)(3)(4) | 98 |
| 11 | (CuO)$_{100}$(ZnO)$_{75}$(Al$_2$O$_3$)$_{12.5}$(MgO)$_{8.3}$ | Na$_2$CO$_3$ | (1)(3)(4) | 99 |
| 12 | (CuO)$_{100}$(ZnO)$_{75}$(Al$_2$O$_3$)$_{12.5}$(MgO)$_{16.7}$ | Na$_2$CO$_3$ | (1)(3) | 123 |
| 13 | (CuO)$_{100}$(ZnO)$_{75}$(Al$_2$O$_3$)$_{12.5}$(MgO)$_{8.3}$ | NaHCO | (1)(3) | 134 |
| Comparative catalyst | (CuO)$_{100}$(Al$_2$O$_3$)$_{12.5}$ | Na$_2$CO$_3$ | (5) | 24 |

EXAMPLE 1

A methanol reforming test was conducted by using each of catalysts 1 to 13 and the comparative catalyst. Specifically, each catalyst was molded into pellets and loaded in a reactor of a fixed bed circulating type test apparatus. Then, a test gas containing 1% of hydrogen and the balance of nitrogen was supplied at 150° C. and at a GHSV of 2,000 h$^{-1}$ so as to achieve activation by a reducing treatment.

In the next step, a reaction gas containing an evaporated methanol, steam and oxygen was supplied at 200° C. and 3 atm into each of the catalyst bed at a GHSV of 10,000 h$^{-1}$ so as to carry out a methanol steam reforming reaction and a partial oxidation reaction simultaneously and, thus, to obtain a hydrogen-containing gas. The molar ratio of H$_2$O/CH$_3$OH of the reaction gas was 2.2, and the molar ratio of the air/CH$_3$OH of the reaction gas was set at 0.8 (the molar ratio of O$_2$/CH$_3$OH being 0.16). The methanol conversion rate and the CO concentration at the outlet of the catalyst bed were measured, with the results as shown in Table 2. An additional experiment to carry out a methanol steam reforming reaction and a partial oxidizing reaction was conducted similarly, except that the temperature of the reaction gas was set at 250° C. so as to form a hydrogen-containing gas. The methanol conversion rate and the CO concentration at the outlet of the catalyst bed were also measured, with the results as shown in Table 2.

TABLE 2

| Catalyst No. | 200° C. | | 250° C. | |
| --- | --- | --- | --- | --- |
| | Methanol conversion rate (%) | CO concentration at outlet (%) | Methanol conversion rate (%) | CO concentration at outlet (%) |
| 1 | 70 | 0.3 | 82 | 0.4 |
| 2 | 73 | 0.2 | 85 | 0.5 |
| 3 | 75 | 0.3 | 88 | 0.5 |
| 4 | 77 | 0.3 | 89 | 0.6 |
| 5 | 76 | 0.4 | 90 | 0.5 |
| 6 | 80 | 0.3 | 91 | 0.5 |
| 7 | 76 | 0.3 | 90 | 0.6 |
| 8 | 74 | 0.3 | 88 | 0.6 |
| 9 | 76 | 0.2 | 89 | 0.5 |
| 10 | 75 | 0.3 | 87 | 0.6 |
| 11 | 74 | 0.4 | 88 | 0.6 |
| 12 | 75 | 0.4 | 86 | 0.6 |
| 13 | 78 | 0.3 | 90 | 0.5 |
| Comparative catalyst | 24 | 0.6 | 37 | 1.0 |

As apparent from Table 2, each of catalysts 1 to 13, whose metal component includes Cu, Zn and Al, is higher in the methanol conversion rate and lower in the CO concentration (CO concentration of the hydrogen-containing gas) at the outlet of the catalyst bed than the comparative catalyst.

EXAMPLE 2

A methanol steam reforming reaction and a partial oxidizing reaction were carried out by using catalyst 9 under various conditions. Specifically, the $H_2O/CH_3OH$ molar ratio, the $O_2/CH_3OH$ molar ratio, the temperature, the pressure and the GHSV of the reaction gas were changed as shown in Table 3 as conditions 1 to 6 so as to form a hydrogen-containing gas by the methanol steam reforming reaction and the partial oxidizing reaction. The methanol conversion rate and the CO concentration at the outlet of the catalyst bed were measured, with the results as shown in Table 3:

TABLE 3

| Conditions | GHSV ($h^{-1}$) | $H_2O/CH_3OH$ molar ratio | $O_2/CH_3OH$ molar ratio | Pressure (atm) | Temperature (° C.) | Methanol conversion ratio (%) | CO concentration at outlet (%) | Remarks |
| --- | --- | --- | --- | --- | --- | --- | --- | --- |
| 1 | 5000 | 2.2 | 0.16 | 3 | 250 | 96 | 0.7 | Influence of GHSV |
| 2 | 10000 | 1.8 | 0.16 | 3 | 250 | 92 | 0.6 | Influence of $H_2O/CH_3OH$ molar ratio |
| 3 | 10000 | 2.2 | 0.24 | 3 | 250 | 94 | 0.7 | Influence of $O_2/CH_3OH$ molar ratio |
| 4 | 10000 | 2.2 | 0.16 | Atmospheric pressure | 250 | 88 | 0.4 | Influence of pressure |
| 5 | 10000 | 2.2 | 0.16 | 6 | 250 | 87 | 0.5 | Influence of pressure |
| 6 | 10000 | 2.2 | 0.16 | 3 | 300 | 97 | 0.8 | Influence of temperature |

Table 3 clearly shows that catalyst 9 permits a high methanol conversion rate and a low CO concentration (CO concentration of the hydrogen-containing gas) at the outlet of the catalyst bed in the cases where the conditions of the reaction gas were changed as conditions 1 to 6.

As described above, the present invention provides a methanol reforming catalyst that permits promoting both the steam reforming reaction denoted by reaction formula (1) given previously and the partial oxidizing reaction denoted by reaction formula (3) given previously so as to achieve a high methanol conversion rate and to suppress the carbon monoxide formation, and also provides a method of manufacturing the particular methanol reforming catalyst.

The present invention also provides a methanol reforming method that permits promoting both the steam reforming reaction denoted by reaction formula (1) given previously and the partial oxidizing reaction denoted by reaction formula (3) given previously so as to improve the methanol conversion rate and to suppress the carbon monoxide formation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A methanol reforming catalyst comprising an oxide represented by general formula (1):

$$(CuO)_w(ZnO)_x(Al_2O_3)_yM_z \qquad (1)$$

where M is at least one oxide selected from the group consisting of lanthanum oxide, gallium oxide, cerium oxide and chromium oxide, and the molar ratios w, x, y and z are: w=100, 30≦x≦160, 1≦y≦50 and 0≦z≦30.

2. A methanol reforming catalyst comprising an oxide containing Cu, Zn, Al and at least one element selected from the group consisting of La, Ga, Ce and Cr, said oxide having a specific surface area as measured by BET method of 30 to 250 $m^2/g$.

3. A method of manufacturing a methanol reforming catalyst, comprising:

mixing a precipitant, an aqueous solution containing an aluminum component and an aqueous solution containing a zinc component, and allowing a precipitate to be generated under a basic condition, said precipitant containing at least one aqueous solution selected from the group consisting of an aqueous solution of sodium carbonate ($Na_2CO_3$) and an aqueous solution of sodium bicarbonate ($NaHCO_3$);

allowing a new precipitate to be generated on a surface of said precipitate under a basic condition by adding an aqueous solution containing a copper component to a suspension prepared, thereby obtaining, as a precipitate, a basic metal carbonate containing a copper component, a zinc compound and an aluminum component;

washing the precipitate of said basic metal carbonate; and sintering said precipitate.

4. The method of manufacturing a methanol reforming catalyst according to claim 3, wherein said basic metal carbonate has a crystal structure comprising at least one crystal structure selected from the group consisting of $Cu_2CO_3(OH)_2$, $(Cu, Zn)_2CO_3(OH)_2$, $Zn_4CO_3(OH)_6 \cdot H_2O$ and $(Cu, Zn)_8Al_2CO_3(OH)_{16} \cdot H_2O$.

5. The method of manufacturing a methanol reforming catalyst according to claim 3, wherein the temperature of said precipitant is maintained at 15 to 90° C.

6. A method of manufacturing a methanol reforming catalyst, comprising:

mixing a precipitant, an aqueous solution containing an aluminum component, an aqueous solution containing a zinc component, and an aqueous solution containing at least one metal component selected from the group consisting of La, Ca, Ga, Zr, Ce, Cr, Ba and Mg and allowing a precipitate to be generated under a basic condition, said precipitant containing at least one aqueous solution selected from the group consisting of an aqueous solution of sodium carbonate ($Na_2CO_3$) and an aqueous solution of sodium bicarbonate ($NaHCO_3$);

allowing a new precipitate to be generated on a surface of said precipitate under a basic condition by adding an aqueous solution containing a copper component to a suspension prepared, thereby obtaining, as a precipitate, a basic metal carbonate containing a copper component, a zinc component and an aluminum component;

washing the precipitate of said basic metal carbonate; and sintering said precipitate.

7. The method of manufacturing a methanol reforming catalyst according to claim 6, wherein said basic metal carbonate has a crystal structure comprising at least one crystal structure selected from the group consisting of $Cu_2CO_3(OH)_2$, $(Cu, Zn)_2CO_3(OH)_2$, $Zn_4CO_3(OH)_6 \cdot H_2O$ and $(Cu, Zn)_8Al_2CO_3(OH)_{16} \cdot H_2O$.

8. The method of manufacturing a methanol reforming catalyst according to claim 6, wherein the temperature of said precipitant is maintained at 15 to 90° C.

9. A methanol reforming method, comprising bringing a gas containing a methanol, steam and oxygen into contact with a methanol reforming catalyst having a complex oxide containing Cu, Zn, Al and at least one element selected from the group consisting of La, Ga, Ce and Cr so as to allow methanol to react with said steam and oxygen, thereby forming a hydrogen-containing gas.

10. The methanol reforming method according to claim 9, wherein the molar ratio of said steam to said methanol ($H_2O/CH_3OH$) in said gas is 0.4 to 10 and the molar ratio of said oxygen to said methanol ($O_2/CH_3OH$) in said gas is 0.03 to 2.

11. The methanol reforming method according to claim 9, wherein the temperature of said gas, when the gas is brought into contact with said methanol reforming catalyst, is 100 to 400° C.

12. The methanol reforming method according to claim 9, wherein the pressure of said gas, when the gas is brought into contact with said methanol reforming catalyst, is not lower than atmospheric pressure and not higher than 80 atm.

13. A method of manufacturing a methanol reforming catalyst comprising:

preparing a catalyst precursor consisting essentially of basic metal carbonate containing Cu, Al and Zn and having a crystal structure of at least one kind of crystal structure selected from the group consisting of $Cu_2CO_3(OH)_2$, $(Cu, Zn)_2CO_3(OH)_2$, $Zn_4CO_3(OH)_6 \cdot H_2O$ and $(Cu, Zn)_8Al_2CO_3(OH)_{16} \cdot H_2O$; and sintering said catalyst precursor, thereby obtaining a methanol reforming catalyst.

14. The method of manufacturing a methanol reforming catalyst, according to claim 13, wherein said basic metal carbonate further contains at least one element selected from the group consisting of La, Ga, Ce and Cr.

15. A methanol reforming method, comprising bringing a gas containing methanol, steam and oxygen into contact with the methanol reforming catalyst manufactured by the method according to claim 13, so as to allow methanol to react with said steam and oxygen, thereby forming a hydrogen-containing gas.

16. The methanol reforming method according to claim 15, wherein the molar ratio of said steam to said methanol ($H_2O/CH_3OH$) in said gas is 0.4 to 10 and the molar ratio of said oxygen to said methanol ($O_2/CH_3OH$) in said gas is 0.03 to 2.

17. The methanol reforming method according to claim 15, wherein the molar ratio of said steam to said methanol ($H_2O/CH_3OH$) in said gas is 0.6 to 7 and the molar ratio of said oxygen to said methanol ($O_2/CH_3OH$) in said gas is 0.04 to 1.6.

18. A methanol reforming catalyst comprising an oxide containing Cu, Zn, Al and at least one element selected from the group consisting of La, Ga, Ce and Cr, and at least one element selected from the group consisting of Ca, Zr, Ba and Mg.

19. A methanol reforming catalyst according to claim 1, wherein said molar ratio x, molar ratio y and molar ratio z are $40 \leq x \leq 150$, $2 \leq y \leq 40$ and $0.3 \leq z \leq 25$, respectively.

20. The methanol reforming catalyst according to claim 2, wherein an area of the specific surface area falls within 35 to 210 $m^2/g$.

21. A methanol reforming method, comprising bringing a gas containing a methanol, steam and oxygen into contact with a methanol reforming catalyst comprising a complex oxide so as to allow methanol to react with said steam and oxygen, thereby forming a hydrogen-containing gas, wherein said complex oxide contains Cu, Zn, Al and at least one element selected from the group consisting of La, Ga, Ce and Cr, and a molar ratio of said oxygen to said methanol ($O_2/CH_3OH$) in said gas is 0.03 to 2.

* * * * *